US012687431B2

(12) United States Patent
Fiore et al.

(10) Patent No.: US 12,687,431 B2
(45) Date of Patent: Jul. 21, 2026

(54) SPECTRAL SENSING SYSTEM

(71) Applicant: TECHNISCHE UNIVERSITEIT EINDHOVEN, Eindhoven (NL)

(72) Inventors: Andrea Fiore, Eindhoven (NL); Maurangelo Petruzzella, Eindhoven (NL)

(73) Assignee: TECHNISCHE UNIVERSITEIT EINDHOVEN, Einhoven (NL)

( * ) Notice: Subject to any disclaimer, the term of this patent is extended or adjusted under 35 U.S.C. 154(b) by 95 days.

(21) Appl. No.: 18/570,883

(22) PCT Filed: Jun. 14, 2022

(86) PCT No.: PCT/NL2022/050329
§ 371 (c)(1),
(2) Date: Dec. 15, 2023

(87) PCT Pub. No.: WO2022/265497
PCT Pub. Date: Dec. 22, 2022

(65) Prior Publication Data
US 2024/0183712 A1 Jun. 6, 2024

(30) Foreign Application Priority Data
Jun. 18, 2021 (NL) ..................................... 2028481

(51) Int. Cl.
*G01J 3/28* (2006.01)
*G01J 3/02* (2006.01)
G01J 3/12 (2006.01)

(52) U.S. Cl.
CPC ........... *G01J 3/2803* (2013.01); *G01J 3/0218* (2013.01); *G01J 2003/1213* (2013.01); *G01J 2003/2806* (2013.01)

(58) Field of Classification Search
CPC ................... G01J 3/2803; G01J 3/0218; G01J 2003/1213; G01J 2003/2806; G01J 3/36; G01J 3/12; G01N 21/553; G01N 21/7743
See application file for complete search history.

(56) References Cited

U.S. PATENT DOCUMENTS 6,100,991 A * 8/2000 Challener .......... G01N 21/7743
356/445
6,686,582 B1* 2/2004 Volcker .............. G01N 21/6452
250/461.2

(Continued)

FOREIGN PATENT DOCUMENTS

CN 106404713 A * 2/2017 .......... G01N 21/359
WO 2016023011 A1 2/2016

OTHER PUBLICATIONS

1 PCT International Search Report and Written Opinion dated Sep. 12, 2022; PCT/NL2022/050329.

*Primary Examiner* — Abdullahi Nur
(74) *Attorney, Agent, or Firm* — Suiter Swantz IP

(57) ABSTRACT

The invention relates to a sensing system comprising at least one light emitting source, a sensing element comprising a sensing area, and an optical means for directing light being emitted by the at least one light emitting source onto the sensing area of the sensing element and for directing light being transmitted or reflected from the sensing area of the sensing element to an integrated interrogator; the interrogator having at least one detector configured for detecting part of the spectrum of the light directed from the sensing area of the sensing element.

11 Claims, 14 Drawing Sheets

(56)                    References Cited

U.S. PATENT DOCUMENTS

| | | | | |
|---|---|---|---|---|
| 7,151,598 | B2 * | 12/2006 | Poponin | G01Q 60/22 |
| | | | | 435/287.2 |
| 7,292,333 | B2 * | 11/2007 | Fontaine | G01N 21/253 |
| | | | | 356/300 |
| 7,454,094 | B2 * | 11/2008 | Gollier | G01N 21/7743 |
| | | | | 385/27 |
| 2001/0046050 | A1 * | 11/2001 | Hoyt | G01N 21/6452 |
| | | | | 356/417 |
| 2003/0059855 | A1 | 3/2003 | Cunningham et al. | |
| 2008/0186503 | A1 * | 8/2008 | Kiesel | G01N 21/031 |
| | | | | 356/454 |
| 2009/0032690 | A1 * | 2/2009 | Modavis | G01N 21/253 |
| | | | | 250/227.27 |
| 2009/0309049 | A1 * | 12/2009 | Van Dijk | G01J 3/10 |
| | | | | 250/236 |
| 2010/0105148 | A1 * | 4/2010 | Caracci | G01N 21/45 |
| | | | | 436/164 |
| 2011/0242542 | A1 * | 10/2011 | Maity | G01N 21/45 |
| | | | | 356/450 |
| 2011/0267623 | A1 * | 11/2011 | Matejka | G01N 21/7743 |
| | | | | 356/446 |
| 2015/0094219 | A1 * | 4/2015 | Trowell | C12Q 1/66 |
| | | | | 422/69 |
| 2016/0022389 | A1 * | 1/2016 | Esbech | A61C 9/0066 |
| | | | | 250/208.1 |
| 2017/0269002 | A1 * | 9/2017 | Kristensen | G01J 3/2823 |
| 2018/0252648 | A1 * | 9/2018 | Dohi | G02B 21/008 |

* cited by examiner 115 (115')

SPECTRAL SENSING SYSTEM

BACKGROUND OF THE INVENTION

The invention relates to optical sensing systems based on light being directed to a sensing area and the detection of at least a fraction of the spectrum of light leaving the sensing area.

The general concept of sensing based on a spectral modulation is well known. Many optical sensing systems are based on the measurement of a change of refractive index within or next to the sensor, induced by the measurand. This includes for example measurement of temperature, measurement of concentration in solutions, measurement of gas concentration by (selective) adsorption and sensing of bio-molecules via selective binding on the sensor's surface. The refractive index change produces a change in the reflection properties of the sensor, for example the angular character-istics (in surface plasmon resonance (SPR) sensors) or the spectrum (photonic crystal (PhC) or "guided-mode-reso-nance" sensors, plasmonic nanostructures). This is measured by sending light to the sensor and measuring the properties of the reflected light. Other sensors, based for example on a Fabry-Perot cavity, measure the change in distance between the two mirrors of the cavity, and by that the force or pressure on a mirror, through the change of the spectrum. Other sensors, based for example on a semiconductor mate-rial, measure the variation in temperature by the change of the bandgap through the spectrum of reflected or transmitted light.

And although such sensing elements or sensors can be manufactured compact and cheap, the measurement of the reflected/transmitted spectrum usually requires a complex optical system, typically a high-resolution spectrometer, consisting of a grating and a detector array. Such unit largely determines the size and price of the entire system (10s to 100s k€), making it unsuitable for point-of-care (PoC) or in-field applications. For this reason, the use of this optical sensing method has so far mostly been limited to lab instruments. Another approach is the use of tuneable lasers, which are also expensive.

The present disclosure aims to provide simple, yet ver-satile sensing system, which obviates the above identified constructional drawbacks.

According to a first aspect, the sensing system according to the disclosure comprises at least one light emitting source, a sensing element comprising a sensing area, and an optical means for directing light being emitted by the at least one light emitting source onto the sensing area of the sensing element and for directing light being transmitted or reflected from the sensing area of the sensing element to an integrated interrogator; the interrogator having at least one detector configured for detecting part of the spectrum of the light directed from the sensing area of the sensing element.

Herewith a compact optical sensing system is devised, capable of performing accurate sensing measurements based on spectral resonance.

In a further advantageous example, the at least one detector is provided with a filter element. Preferably the interrogator is provided with two or more detectors, each detector configured for detecting parts of the spectrum.

In preferred designs of limited structural dimensions, yet high measurement accuracy, the two or more detectors are arranged in a circular, square, rectangular, spiral or inter-laced configuration.

In particular, each filter element is arranged on a top face of or within their respective detector, viewed from the direction of the light leaving the sensing element.

Preferably, the filter elements and the detectors are co-integrated in a resonant-cavity detector structure. This con-figuration further improves the sensitivity of the detector thus improving accuracy.

In a more versatile example of the sensing system, the sensing area of the sensing element comprises at least one sample sensor part and at least one reference sensor part, and multiple detectors are used in the interrogator to measure differential wavelength shifts between the at least one sample sensor part and the at least one reference sensor part. Accordingly, as each fraction of light will leave the sample sensor area part and the reference sensor area part of the sensing area, the several (at least two) detectors of the interrogator are able to measure the differential wavelength shifts between the light spectra originating from the sample sensor area part and the reference sensor area part.

In a further example, the sensing element is composed of one of the group selected from a grating, a photonic crystal, a metallic structure, a semiconductor structure, a Fabry-Perot cavity, or a semiconductor slab, whereby the spectrum of light transmitted or reflected from the sensing element changes depending on temperature, or pressure, or refractive index or the binding of molecules on the surface of the sensing area.

Preferably, the surface of the sensing area of the sensing element is configured to facilitate or suppress a selective binding of a certain molecule or type of molecule.

In an advantageous measurement setup, the sensing ele-ment is configured to accommodate a microfluid cell ele-ment in the sensing area.

Furthermore, the at least one light emitting source can comprise of an array of light emitting diode elements. And with the configuration of an array of light emitting diode elements, the sensing element comprising an array of sens-ing area parts and the interrogator comprising an array of detectors, which are mounted face-to-face in a linear or 2D matrix configuration, a simple, yet compact and accurate measurement configuration is obtained for many different targets to be sensed (for example different molecules).

This allows for example to perform spectral measure-ments using multiple sensing elements in parallel, in free-space or via multicore fibers. In particular, the spectral resonances of the sensing elements and the detectors of the interrogator are matched to provide maximum sensitivity to wavelength changes. Furthermore, two or more detectors can be used to compensate for source power fluctuations.

Implementing multiple detectors in the interrogator allow to cover a large spectral range and to achieve a high spectral resolution and dynamic range.

In a further advantageous example, the at least one light source, the sensing element and the optical means are connected via single-mode or multi-mode fibers.

By accommodating the at least one light source, the sensing element and the optical means in one housing module a compact design of the sensing system is obtained.

BRIEF DESCRIPTION OF THE DRAWINGS

The invention will now be discussed with reference to the drawings, which show in.

DETAILED DESCRIPTION OF THE INVENTION

This disclosure describes a sensing system 100 based on a light source 102, a sensing element 103 producing a modulation in the transmission or reflection spectrum, and a detecting element 110 configured as an interrogator consisting of a spectral sensing chip able to measure small wavelength shifts in the resonance.

Figure 1:
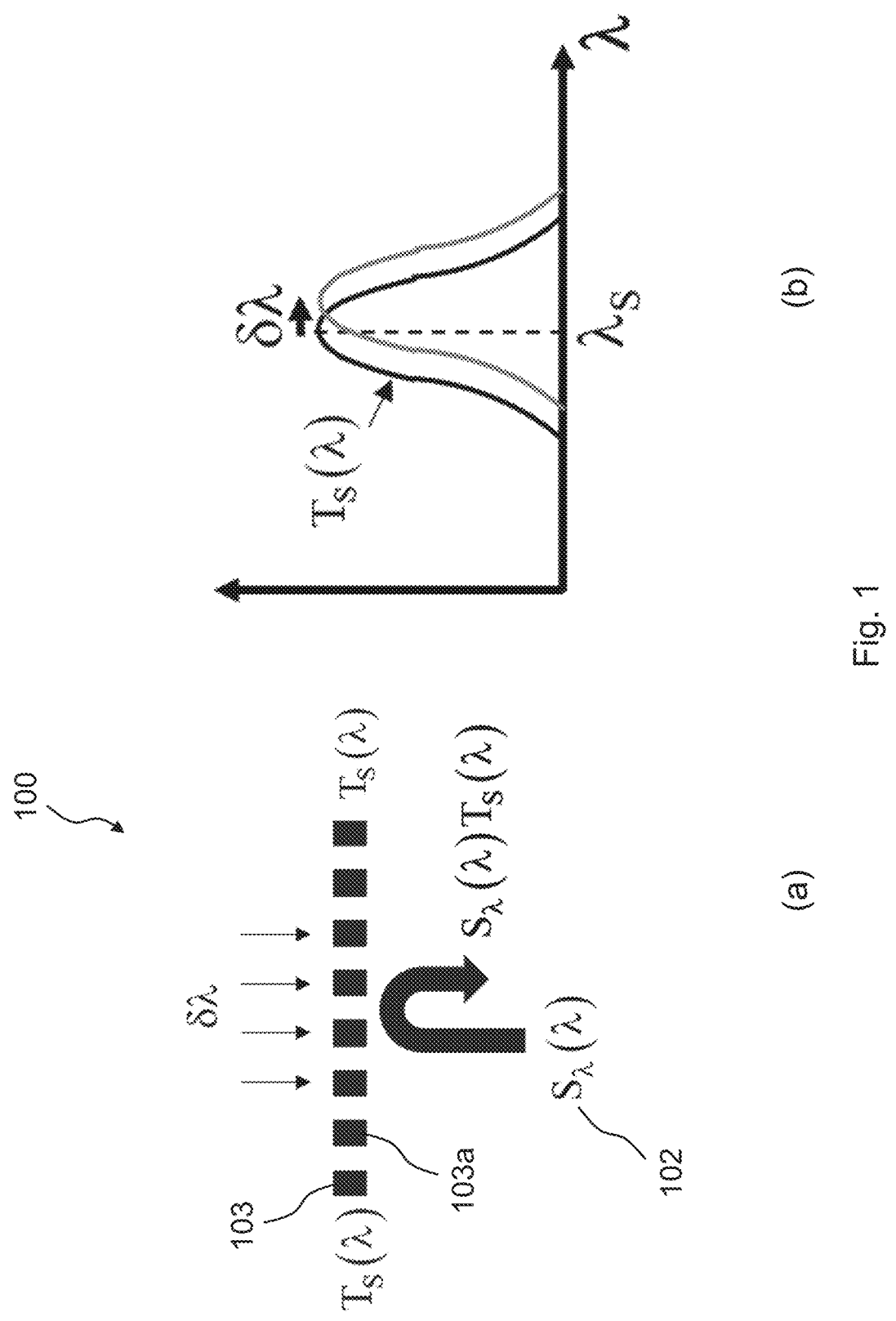
FIG. 1 the schematics of a sensing system based on a spectral resonance according to the disclosure.

The general concept of sensing based on spectral modulation is well known and can be schematized as shown in FIG. 1, which depicts the schematics of a sensing system based on a spectral modulation.

A light beam produced by a light source 102 with a broad spectrum $S_\lambda(\lambda)$ is sent to a structure or sensing element 103 designed to display one or more features in the reflection or transmission spectrum, here indicated as $T_S(\lambda)$. A change in the environment of the sensor produces a spectral shift $\delta\lambda$ in the feature (for example a peak or a dip or a slope), which can be measured by measuring the spectrum of the reflected or transmitted light, $S_\lambda(\lambda)T_S(\lambda)$. The spectral feature can be due to the material or materials of which the sensor is made (for example if it exhibits a bandgap), or to a structure which is patterned on the sensor, for example to produce a resonance. The sensing element 103 or sensor can for example be based on a Fabry-Perot cavity, a fiber Bragg grating (FBG), a free-space grating, a photonic crystal (PhC), a metal film exhibiting a surface plasmon resonance (SPR), a metal nanostructure, a semiconductor layer displaying a temperature-dependent bandgap, etc., and it can be placed in free space or within or on top of an optical fiber. This principle is the basis of a number of commercial sensors, including FBG sensors, fiber-optic temperature sensors and some fiber-tip Fabry-Perot sensors.

Changes in the environment include changes in temperature, refractive index, pressure, force, electric and magnetic fields. Their effect on the sensor can be direct (change of the bandgap or refractive index or mechanical configuration of the sensor) or indirect (change of the refractive index of the material surrounding the sensor)—in both cases these changes produce a change in the spectrum.

By functionalizing the sensor with receptors displaying specific binding to target molecules, the presence of these molecules in a gas or a liquid can be measured with high selectivity and specificity via the change in the refractive index at the surface of the sensor induced by their binding. This principle is used in commercial SPR or PhC-based biosensors. In order to correct for other extrinsic environmental variations, one or more reference sensors (for example sensors not or differently functionalized, or not exposed to the environment) are often included in the sensing area and must be read-out in parallel.

While the sensor itself can be manufactured compact and cheap, the measurement of the reflected/transmitted spectrum, usually requires a complex optical system, typically a high-resolution spectrometer, consisting of a grating and a detector array. Such unit largely determines the size and price of the entire system (10s k€), making it unsuitable for point-of-care (PoC) or in-field applications. For this reason, the use of this optical sensing method has so far mostly been limited to lab instruments. An equivalent approach is the interrogation with a tuneable laser, where the laser wavelength is swept through the spectrum. This method is also expensive due to the cost of the tuneable laser, and subject to additional noise in free-space or multimode fibers, due to the high spatial coherence of the laser light.

The only exceptions are:

FBGs and other fiber-based sensors, for which integrated interrogators have been developed, based on tuneable lasers or photonic integrated circuits (PICs) integrating a wavelength dispersion element and detectors. Their application is limited to single-mode (SM) fibers, as spatial coherence is required, with the corresponding high packaging costs. For PIC-based interrogation, this also implies the use of an expensive SM fiber broad source, typically a superluminescent diode.

Systems based on "Intensity-based" readout, i.e. illumination with a fixed wavelength source tuned at the side of an optical resonance. These allow measuring small spectral shifts, but not the absolute wavelength, and their resolution is limited by the power fluctuations of the source.

According to the disclosure of the invention, an integrated interrogator is used for measuring wavelength shifts of the sensor in a spatial multimode configuration (free-space or multimode-fiber). Also for fiber(-tip) based sensing techniques, the interrogator as used has major advantages with respect to waveguide-based solutions, as it makes it possible to use optical sources with poor spatial coherence (e.g. LEDs), instead of the expensive superluminescent diodes needed to generate a broad spectrum in a single-mode fiber.

Figure 2:
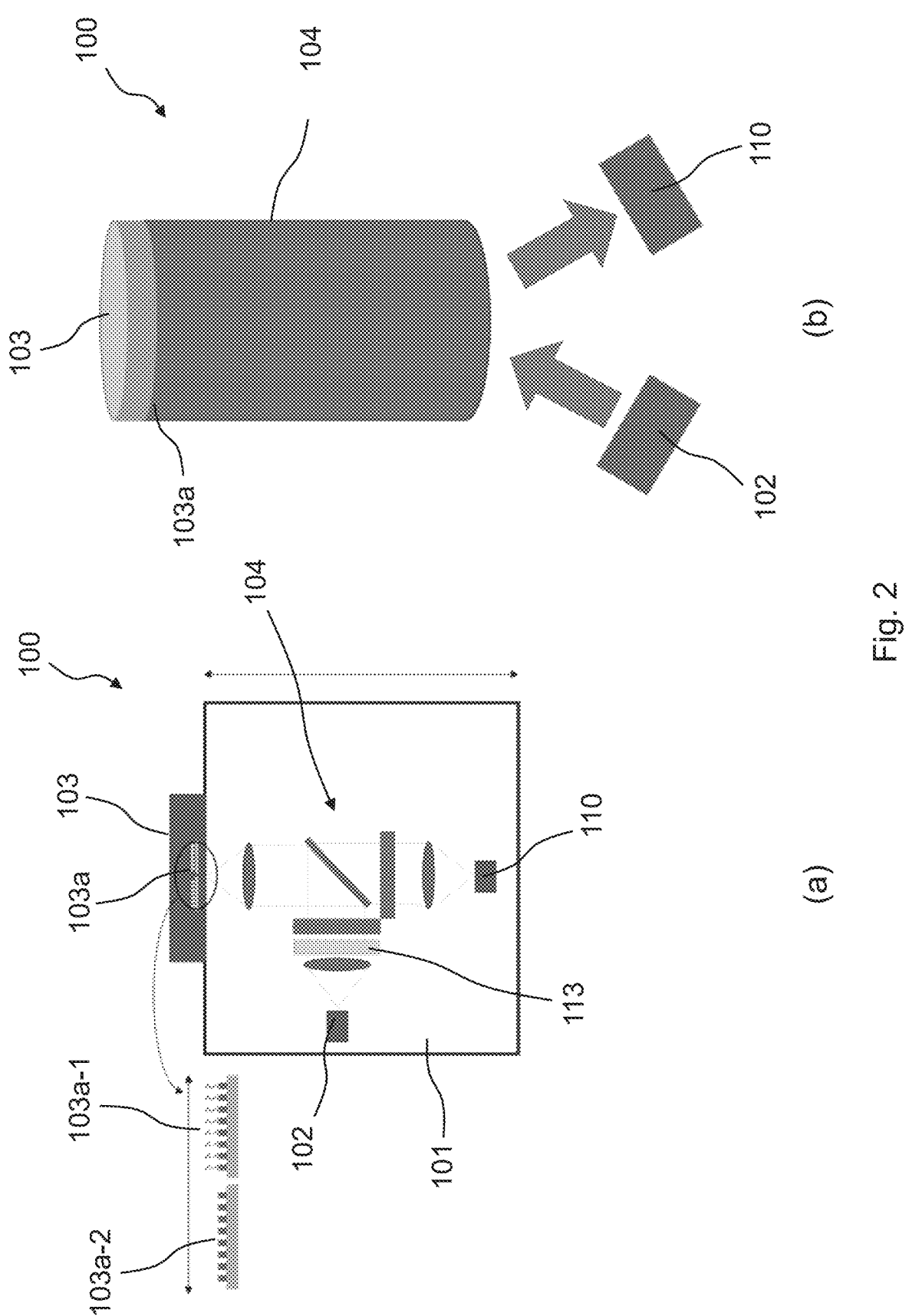
FIG. 2*a* one example of a configuration of a free-space biosensing system using functionalized PhCs.
FIG. 2*b* another example of a configuration of fiber-tip PhC sensor.

FIG. 2 depicts two examples of sensing configurations according to the disclosure. FIG. 2*a* shows a free-space biosensing system 100 using functionalized PhCs sensor elements 103, whereas FIG. 2*b* shows a fiber-tip PhC sensing system 100. The interrogator consists of an array of detectors ("pixels") with integrated filters, tuned to different wavelengths and covering the range of the spectral response of the sensor.

In both examples of FIGS. 2*a* and 2*b*, the sensing system 100 comprises at least one light emitting source 102, a sensing element 103 comprising a sensing area 103*a*, an optical means 104 for directing light being emitted by the (at least one) light emitting source 102 onto the sensing area 103*a* of the sensing element 103 and for directing light being reflected or transmitted by the sensing element 103 to the interrogator 110. The interrogator comprises at least one detecting element 111a-11b-11c-111z (the number of detectors can be arbitrarily chosen for example being 1, 2, or more than 10, 20 or even 50) for detecting a fraction of the spectrum of the light directed from the sensing element 103 to the interrogator 110.

The optical means 104 as depicted in the example of FIG. 2a furthermore might comprise an assembly of lenses, filters, beam-splitters, and polarisers to direct light being emitted by the (at least one) light emitting source 102 onto the sensing area 103a of the sensing element 103 and to redirect light leaving the sensing area 103a of the sensing element 103 onto the at least one detecting element (interrogator) 110. The sensing element 103 is configured such that light reflected or transmitted by it has a different spectrum depending on the quantity to be measured. The optical means 104 in the example of FIG. 2b are formed as an optical fiber.

Figure 3:
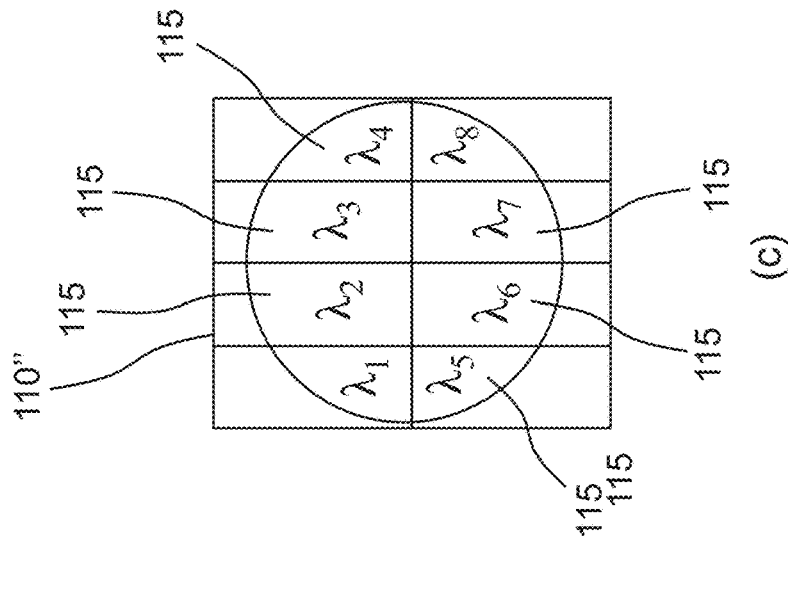
FIG. 3*a* schematics of spectral filter functions for the different pixels of the interrogator.
FIG. 3*b* an example of a four-pixel interrogating chip geometry.
FIG. 3*c* an example of eight-pixel interrogating chip geometry.
Figure 3:
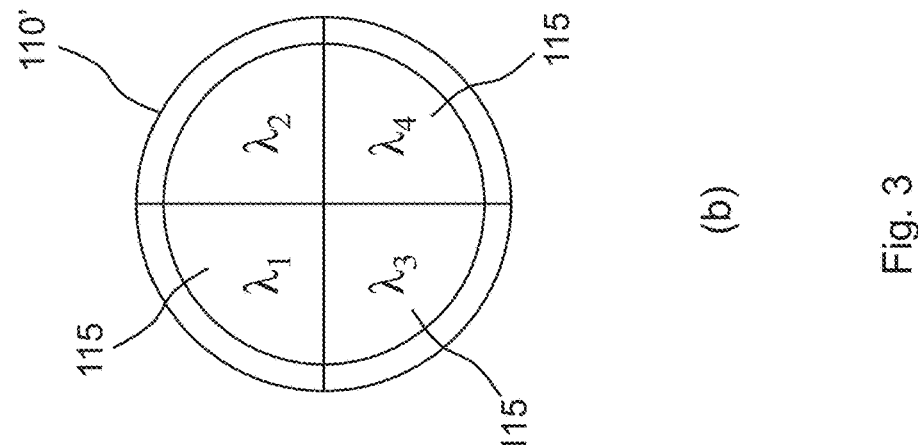
Figure 3:
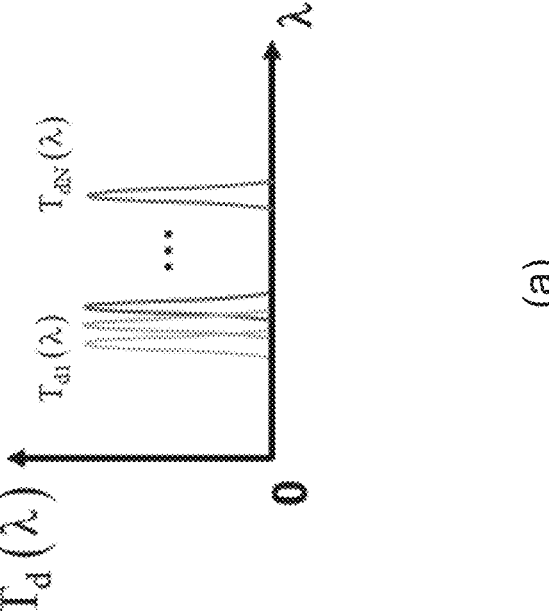

FIG. 3a shows examples of the spectral filter functions for the different pixels of the interrogator 110, whereas FIG. 3b depicts an example of a four-pixel interrogating chip geometry 110' and FIG. 3c depicts an example of eight-pixel interrogating chip geometry 110", being two possible geometries for the distribution of the pixels.

The filters 113 can be arranged on top 112 of the detectors 111a-111b (e.g. using multilayers), or can be formed as resonant cavities around the absorbing layer of the detector, to form resonant-cavity detectors. The geometry of the pixels 115 and the optics 104 are optimized to minimize spatial imaging effects, so that light from each point of the sensor 103 illuminates all the pixels 115 as uniformly as possible. The typical dimension of the pixels 115 is of few 10s to few 100s of 1.1 μm, and the total area of the array is matched to the beam coming from the sensor 103. The sets of photocurrents from the detectors is then used to determine the resonant wavelength (absolute value or shifts) of the sensor and of any reference, as described in detail below.

As to the analysis of the read-out resolution and the spectral interrogation methods used in this disclosure, it is assumed that the sensors have a known spectral shape, including a fixed width, and that only the wavelength and power of the peak can change during a measurement. The interrogation system can in all generality be modelled as a set of detectors, each having a spectrally-dependent responsivity $$R_i(\lambda) = T_{di}(\lambda)\eta\frac{e}{hv}$$

given by the product of the filtering function $T_{di}(\lambda)$ and a constant $$\eta\frac{e}{hv}$$

(in A/W) describing the detector current/power conversion efficiency, where η is the detector quantum efficiency, e the electron charge, h the Planck's constant and v the frequency.

It is also assumed that η and v are approximately constant in the spectral range of interest. The photocurrent in pixel i is then given by:

$$I_i = \eta\frac{e}{hv}P_{di} = \eta\frac{e}{hv}\int S_\lambda(\lambda)T_{di}(\lambda)T_S(\lambda + \Delta\lambda)d\lambda, \qquad (1)$$

where $P_{di}$ is the power absorbed in detector i $S_\lambda(\lambda)$ is the spectral power density of the light source, assumed to vary little throughout the spectral range of interest $T_S(\lambda)$ is the transmission or reflection of the sensor in a reference situation (e.g. a reference temperature), and $\Delta\lambda$ is the wavelength shift induced by a change in the sensor environment (e.g. a change in temperature).

The sensing goal is the determination of $\Delta\lambda$ from the measurement of the photocurrents $I_i$. Eq. (1) also describes the standard read-out with spectrometers, where typically $T_{di}(\lambda)$ are narrow spectral functions and a large number of pixels 115 (500-1000) is used. In the following it is shown that this approach is not always the most efficient for the measurement of $\Delta\lambda$.

First, the case of the measurement of small spectral shifts ($\Delta\lambda$≪linewidths of sensor and interrogator), as relevant for biosensors, is discussed and as second, the case where a larger dynamic range is needed (measurement of temperature, refractive index and pressure) is discussed.

As to the first discussion of small spectral shifts, a single-pixel read-out is considered in order to explore the fundamental limits of wavelength resolution. The power on a detector is given by $$P_d = \int S_\lambda T_d(\lambda)T_S(\lambda + \Delta\lambda + \delta\lambda_S)d\lambda$$

where $T_d(\lambda)$ describes the filter 113 at the detector 111a-11b, $T_S(\lambda)$ the sensor spectral line, when centered at the same wavelength as the detector, and $\delta\lambda$ a "bias" wavelength shift of the sensor, which can be chosen to maximize the sensitivity.

$\delta\lambda_S$ the small wavelength shift to be measured

Figure 4:
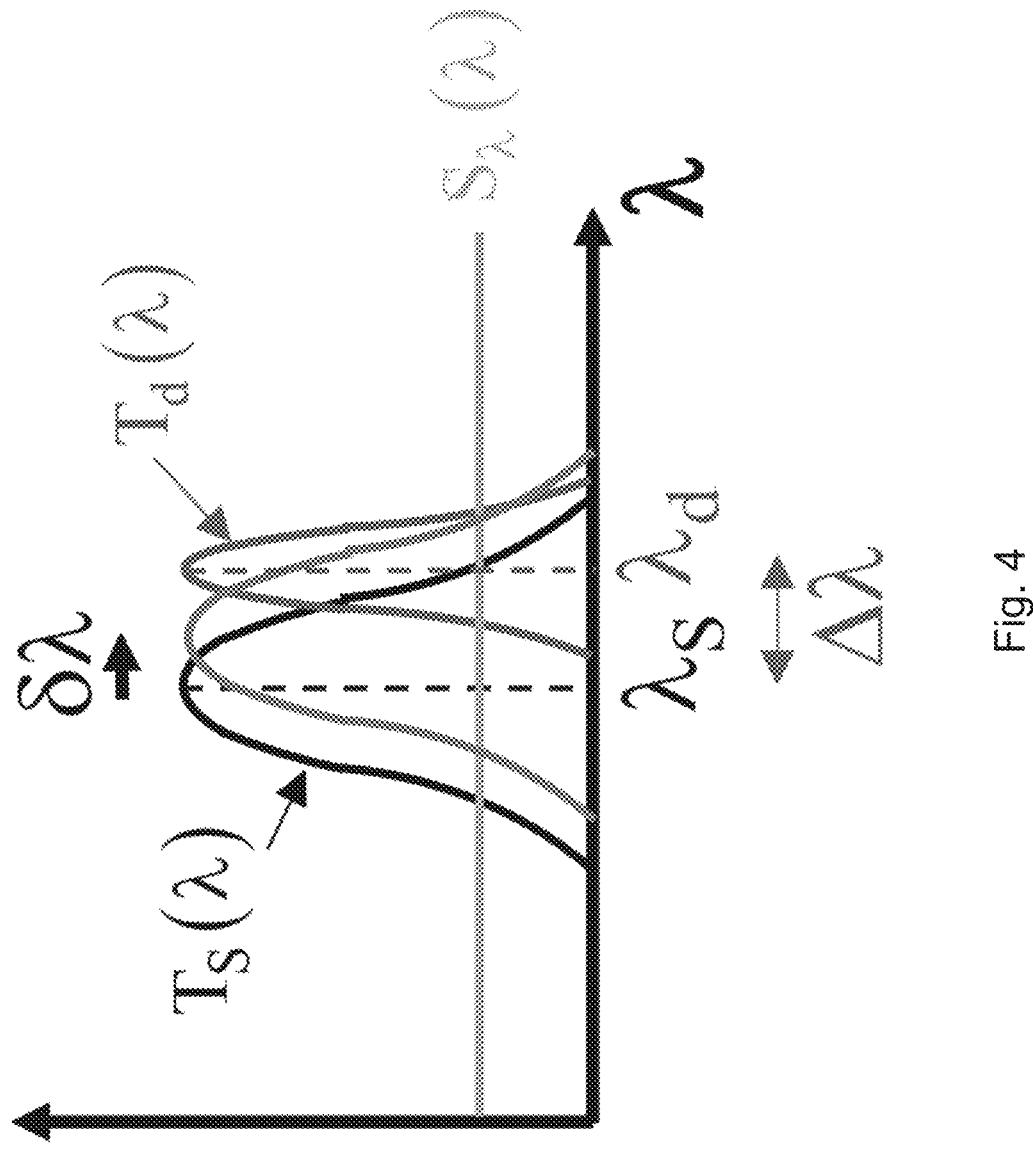
FIG. 4 a single-pixel configuration for measuring small wavelength shifts.

An example of such single-pixel configuration for measuring small wavelength shifts is shown in FIG. 4.

For small spectral shifts:

$$\delta P_d \simeq \frac{dP_d}{d\lambda_S}\delta\lambda_S.$$

Assuming that $S_\lambda$ is uniform in the spectral range of interest, the following is obtained $$\frac{dP_d}{d\lambda_S} = S_\lambda\int T_d(\lambda)\frac{dT_S}{d\lambda}(\lambda + \Delta\lambda)d\lambda.$$

The "sensitivity"

$$\int T_d(\lambda)\frac{dT_S}{d\lambda}(\lambda + \Delta\lambda)d\lambda$$

is adimensional, suggesting that it does not depend on the spectral widths of the sensor and interrogator if they are scaled equally (this is easily proved), and that it is of order 1 (if the max of $T_d$ and $T_S$ is one). For $T_d=T_S$, the sensitivity is equal to the autocorrelation of the line with its derivative.

Figure 5:
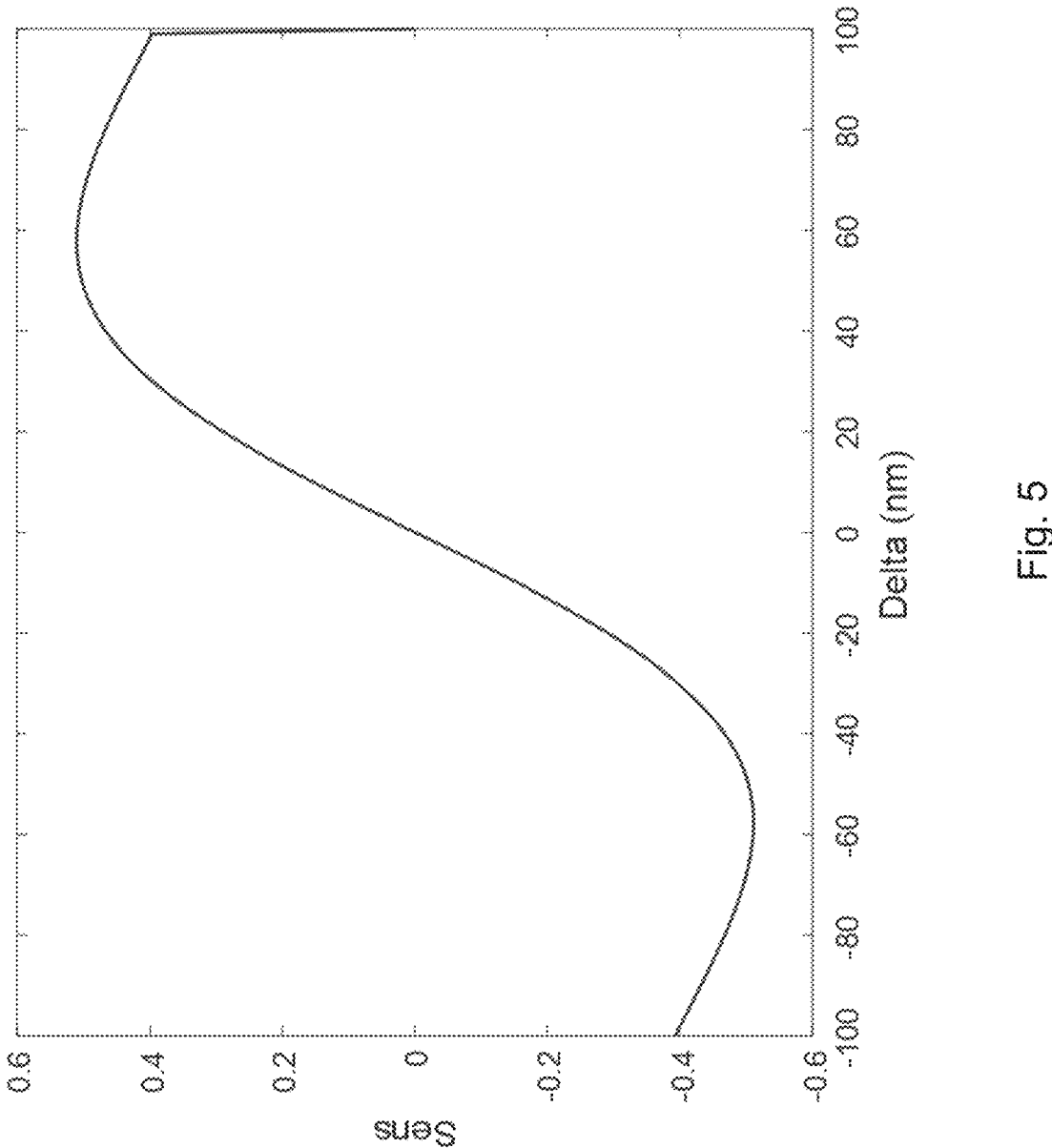
FIG. 5 calculated sensitivity as a function of the bias wavelength shift $\Delta\lambda$.

Numerical calculations confirm this assumption. Assuming equal spectral filters for the sensor and the interrogator, with a Lorentzian line with $\Delta\lambda_{HWHM}$=50 nm, the sensitivity varies as depicted in FIG. 5, which shows the calculated sensitivity as a function of the bias wavelength shift $\Delta\lambda$.

The sensitivity is zero at $\Delta\lambda=0$, and maximum for $\Delta\lambda\sim\Delta\lambda_{HWHM}$. The sensitivity takes a maximum value of 0.51, independent of $\Delta\lambda_{HWHM}$. For asymmetric sensor-interrogator linewidths the sensitivity is always lower. It is concluded that the best configuration for measuring small wavelength shifts using a broadband source is the one where sensor and interrogator have comparable linewidths.

Thus $$\frac{dP_d}{d\lambda_S}\Big|_{max} \simeq 0.5 \cdot S_\lambda$$

is obtained (for a single line), and the minimum measurable spectral shift is $$\delta\lambda_{Smin} = \frac{NEP}{\frac{dP}{d\lambda_S}} \simeq 2\frac{NEP}{\lambda_S}$$

where NEP is the noise-equivalent power at the detector.

In the case of shot-noise-limited performance, NEP= $\sqrt{2hvP_d\Delta f}$ and observing that at the optimum bias point $P_d\approx0.5\cdot S_\lambda\Delta\lambda_d$, where $\Delta\lambda_d$ is the linewidth of the detector filter, FWHM, the ultimate limit is found to be $$\delta\lambda_{Smin} = 2\frac{\sqrt{2hvP_d\Delta f}}{S_\lambda} = 2\sqrt{hv\frac{\Delta\lambda_d}{S_\lambda}}\sqrt{\Delta f}$$

Assuming that $S_{\lambda source}\sim20$ µW/nm (2 mW over 100 nm, coupled to a 400 µm multimode fiber), a total loss of 30 dB (sensor transmittance/reflectance+loss in the setup), and an additional loss of ×4 due to multiplexing in the detector (4 pixels), gives $S_{\lambda det}\sim5$ nW/nm.

Assuming for example a detector linewidth of 30 nm FWHM, and shot-noise limited performance, this gives $P_d=150$ nW and $$\delta\lambda_{Smin} \sim \frac{60\,fm}{\sqrt{Hz}}\sqrt{\Delta f}.$$

More realistically, the detector will be limited by thermal noise. In this example, the wavelength resolution is independent of the linewidths of sensor and interrogator, but depends only on the spectral power density at the detector, and its noise.

Assuming that NEP=10 pW (1 pW) (SNR of ~$10^4$ or $10^5$, respectively) gives $$\delta\lambda_{Smin} \sim \frac{0.4\,pm}{\sqrt{Hz}}\sqrt{\Delta f}\ \left(\delta\lambda_{Smin} \sim \frac{0.04\,pm}{\sqrt{Hz}}\sqrt{\Delta f}\right)$$

respectively.

Considering the case of bulk refractive index sensors using a PhC and assuming a refractive index sensitivity S=200 nm/RIU and a measurement bandwidth of 1 Hz, this gives a $$\delta n_{min} \sim \frac{2\times10^{-6}}{\sqrt{Hz}}\sqrt{\Delta f},$$

or a limit of detection (LOD) LOD=$3\cdot\delta n_{min}\sim10^{-5}$ RIU for NEP=10 pW (LOD~$10^{-6}$ for NEP=1 pW)

As to self-referencing by multipixel measurements, the above estimations do not take into account the most common sources of noise in a practical system, namely fluctuations of the source power and spurious wavelength fluctuations, due for example to temperature fluctuations (and non-specific binding for a biosensor).

Figure 6:
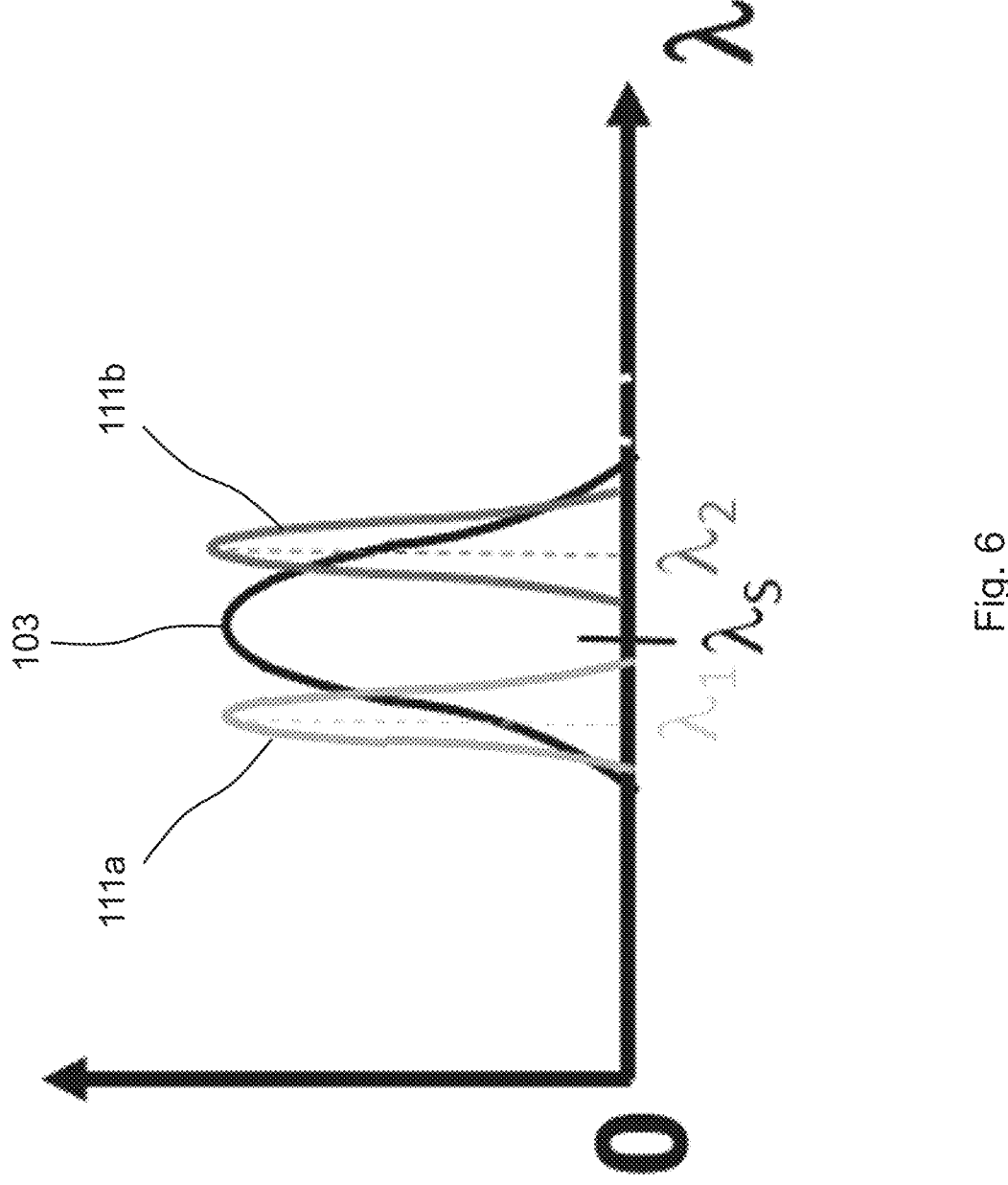
FIG. 6 a configuration for compensating power fluctuations.

A first approach for eliminating the effect of power fluctuations is to use two pixels, differently detuned with respect to the sensor. FIG. 6 depicts the configuration for compensating power fluctuations.

The powers absorbed in the two pixels are given by:

$$\begin{cases} P_1 = \int S_\lambda T_{d1}(\lambda)T_S(\lambda_S)d\lambda \simeq S_\lambda R_1(\lambda_S) \\ P_2 = \int S_\lambda T_{d2}(\lambda)T_S(\lambda_S)d\lambda \simeq S_\lambda R_2(\lambda_S) \end{cases}$$

where is defined $R_i(\lambda_S)\equiv\int T_{di}(\lambda)T_S(\lambda_S)d\lambda$ For small variations of $\lambda_S$ and $S_\lambda$, Eq. 2 gives:

$$\begin{bmatrix} \delta P_1 \\ \delta P_2 \end{bmatrix} = \begin{bmatrix} S_\lambda\frac{\partial R_1}{\partial\lambda_S} & R_1 \\ S_\lambda\frac{\partial R_2}{\partial\lambda_S} & R_2 \end{bmatrix}\begin{bmatrix} \delta\lambda_S \\ \delta S_\lambda \end{bmatrix} \tag{2}$$

The least-squares estimation is given by $$\begin{bmatrix} \delta\lambda_S \\ \delta S_\lambda \end{bmatrix} = \left(X^TX\right)^{-1}X^T\begin{bmatrix} \delta P_1 \\ \delta P_2 \end{bmatrix} = X^{-1}\begin{bmatrix} \delta P_1 \\ \delta P_2 \end{bmatrix} \tag{3}$$

$$\text{where } X = \begin{bmatrix} S_\lambda\frac{\partial R_1}{\partial\lambda_S} & R_1 \\ S_\lambda\frac{\partial R_2}{\partial\lambda_S} & R_2 \end{bmatrix}$$

This is a special case of the general expression for least-square estimations. This gives $$\begin{bmatrix} \delta\lambda_S \\ \delta S_\lambda \end{bmatrix} = \frac{1}{S_\lambda}\frac{1}{R_2\frac{\partial R_1}{\partial\lambda_S} - R_1\frac{\partial R_2}{\partial\lambda_S}}\begin{bmatrix} R_2\delta P_1 - R_1\delta P_2 \\ S_\lambda\frac{\partial R_1}{\partial\lambda_S}\delta P_2 - S_\lambda\frac{\partial R_2}{\partial\lambda_S}\delta P_1 \end{bmatrix} \tag{4}$$

The least-square estimation for the wavelength shift is $$\delta\hat\lambda_S = \frac{P_2\delta P_1 - P_1\delta P_2}{P_2\frac{\partial P_1}{\partial\lambda_S} - P_1\frac{\partial P_2}{\partial\lambda_S}} = \frac{\dfrac{\delta P_1}{P_1} - \dfrac{\delta P_2}{P_2}}{\dfrac{1}{P_1}\dfrac{\partial P_1}{\partial\lambda_S} - \dfrac{1}{P_2}\dfrac{\partial P_2}{\partial\lambda_S}} \tag{5}$$

For the symmetric detuning case sketched in FIG. 5:

$$P_1 = P_2, \frac{\partial P_1}{\partial \lambda_S} = -\frac{\partial P_2}{\partial \lambda_S},$$

which gives:

$$\delta \hat{\lambda}_S = \frac{\delta P_1 - \delta P_2}{2 \frac{\partial P_1}{\partial \lambda_S}} \tag{6}$$

Expressions 5 and 6 provide an estimation of the wavelength shift insensitive to power fluctuations, as expected. They can also be used to determine the minimum measurable shifts. If it is assumed that the noise photocurrents are uncorrelated and have the same rms value, and that the latter is independent of the photocurrent (thermal noise), the wavelength imprecision scales as $$\delta \hat{\lambda}_{Sn} = \sqrt{\frac{1}{\left(2 \frac{\partial P_1}{\partial \lambda_S}\right)^2}(\delta P_{1n}^2 + \delta P_{2n}^2)} = \frac{\delta P_{1n}}{\sqrt{2} \left|\frac{\partial P_1}{\partial P_2}\right|}$$

This result can be generalized to N spectral data points, leading to $\sim 1/\sqrt{N}$ scaling of the imprecision, assuming that all pixels have the same $$\frac{\partial P_i}{\partial \lambda_S}.$$

This dependence is the same expected for any repetitive measurement of a physical variable in the presence of random noise. It is also the dependence observed in fitting noisy Lorentzian peaks for different numbers of wavelength points. It should be noted that, for a fixed beam area and total number of photons, breaking up the interrogator in more pixels tends to degrade the imprecision by a factor $\sqrt{N}$, as the power per pixel P, scales as 1/N. The best sensing performance with correction for source fluctuations is therefore achieved with two pixels 115. This shows that this interrogation approach, besides being much simpler, shows a fundamentally better sensing performance that a high-resolution measurement of the sensor peak using a spectrometer.

In any practical sensing system, temperature fluctuations in the sensor 103 and/or the interrogator 110 and other environmental changes produce spurious changes in the resonance, that must be corrected for. In biosensing, non-specific binding is an additional source of noise. The simplest way of compensating non-specific environmental changes, such as the effects of temperature fluctuations and non-specific binding, is to add a reference structure which does not respond to the stimulus of interest, for example because it is not functionalized, or it is protected (e.g. covered by a coating layer).

The signal of interest is in this case $\delta \lambda_S - \delta \lambda_R$.

Figure 7:
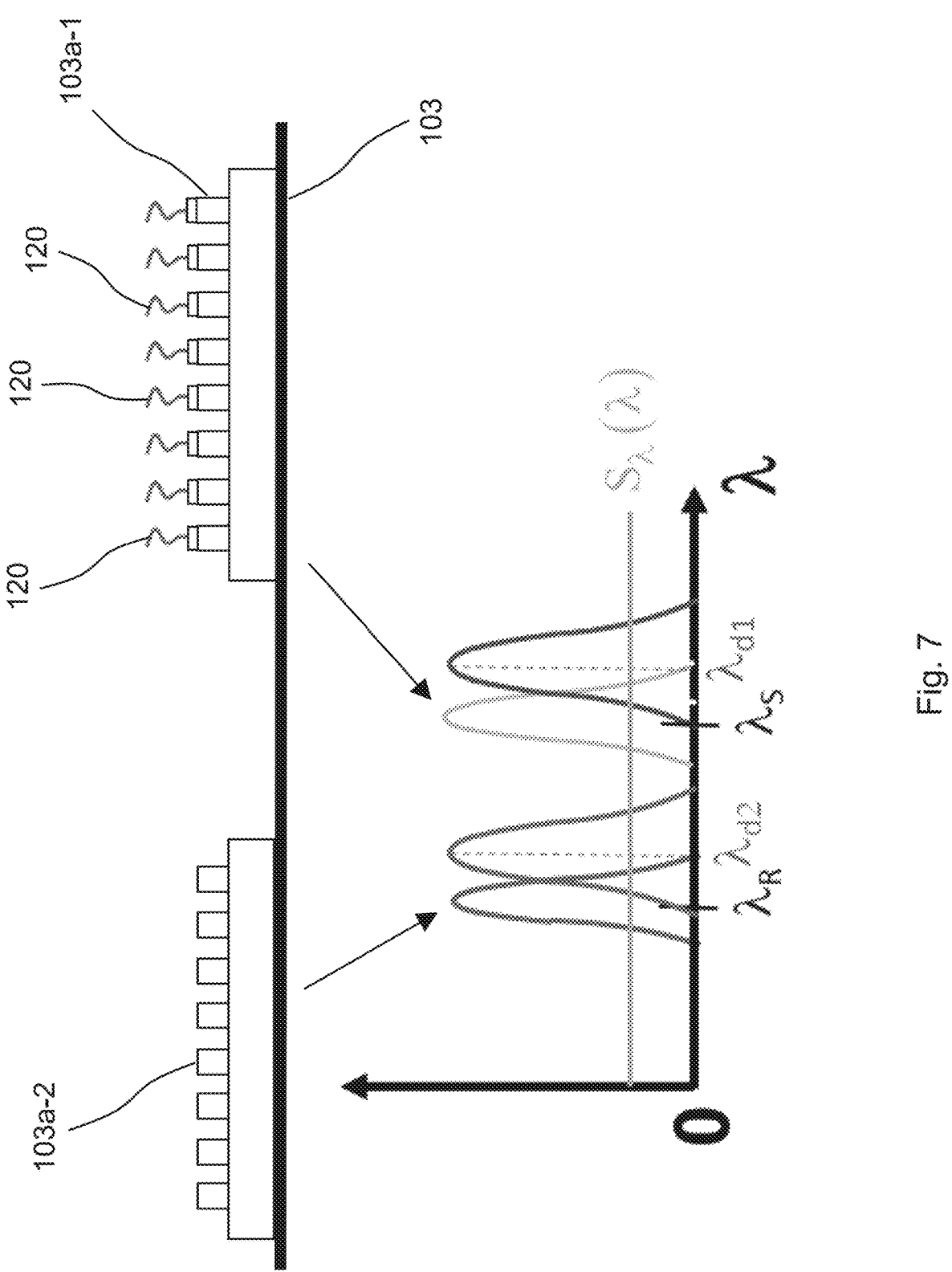
FIG. 7 a two-pixel configuration for the simultaneous interrogation of a sensor and a reference.

A first approach to achieve this compensation is the configuration shown in FIG. 7 showing a two-pixel configuration for the simultaneous interrogation of a sample sensor part 103a-1 and a reference sensor part 103a-2. In this configuration, the resonances of the sample sensor part 103a-1 and reference sensor part 103a-2 are defined on the same structure or sensing element 103, by functionalizing only a part of the sensing area (the sample sensor part

103a-1 and reference sensor part 103a-2 could be spatially separated or interleaved). In this case two detector pixels are used, centered at wavelengths $\lambda_{d1}$, $\lambda_{d2}$.

The power absorbed in the two detectors is:

$$\begin{cases} P_1 = \int S_\lambda T_{d1}(\lambda) T_S(\lambda_S) d\lambda \simeq S_\lambda R_1(\lambda_S) \\ P_2 = \int S_\lambda T_{d2}(\lambda) T_R(\lambda_R) d\lambda \simeq S_\lambda R_2(\lambda_R) \end{cases}$$

The difference in the power detected in the two pixels, $$\Delta P = P_1 - P_2 = S_\lambda(R_1(\lambda_S) - R_2(\lambda_R))$$

and its varies as $$\delta(P_1 - P_2) = \delta P_1 - \delta P_2 = S_\lambda \left(\frac{dR_1}{d\lambda_S} \delta \lambda_S - \frac{dR_2}{d\lambda_R} \delta \lambda_R\right)$$

If the reference channels of the reference sensor part 103a-2 and sensor channels of the sample sensor part 103a-1 are balanced, $$\frac{dR_1}{d\lambda_S} = \frac{dR_2}{d\lambda_R},$$

then the desired differential measurement $$\delta(P_1 - P_2) = S_\lambda \frac{dR_1}{d\lambda_S} \delta(\lambda_S - \lambda_R)$$

is obtained. This can be further made first-order insensitive to power fluctuations by normalizing by the sum of the powers:

$$A = \frac{P_1 - P_2}{P_1 + P_2} = \frac{R_1(\lambda_S) - R_2(\lambda_R)}{R_1(\lambda_S) + R_2(\lambda_R)}$$

The differential read-out can be performed at the detector level by balanced photodetection. Alternatively, an electronic circuit can be used to measure the sum and difference of the two photocurrents, before the analog-to-digital (ADC) conversion (this reduces the effect of noise in the ADC). In order to obtain the insensitivity to source power while measuring only the difference, the bias point at $\Delta P=0$ can be maintained by a feedback circuit in an auto-balanced detector configuration. In alternative, the two powers can be separately measured and A calculated by software.

Figure 8:
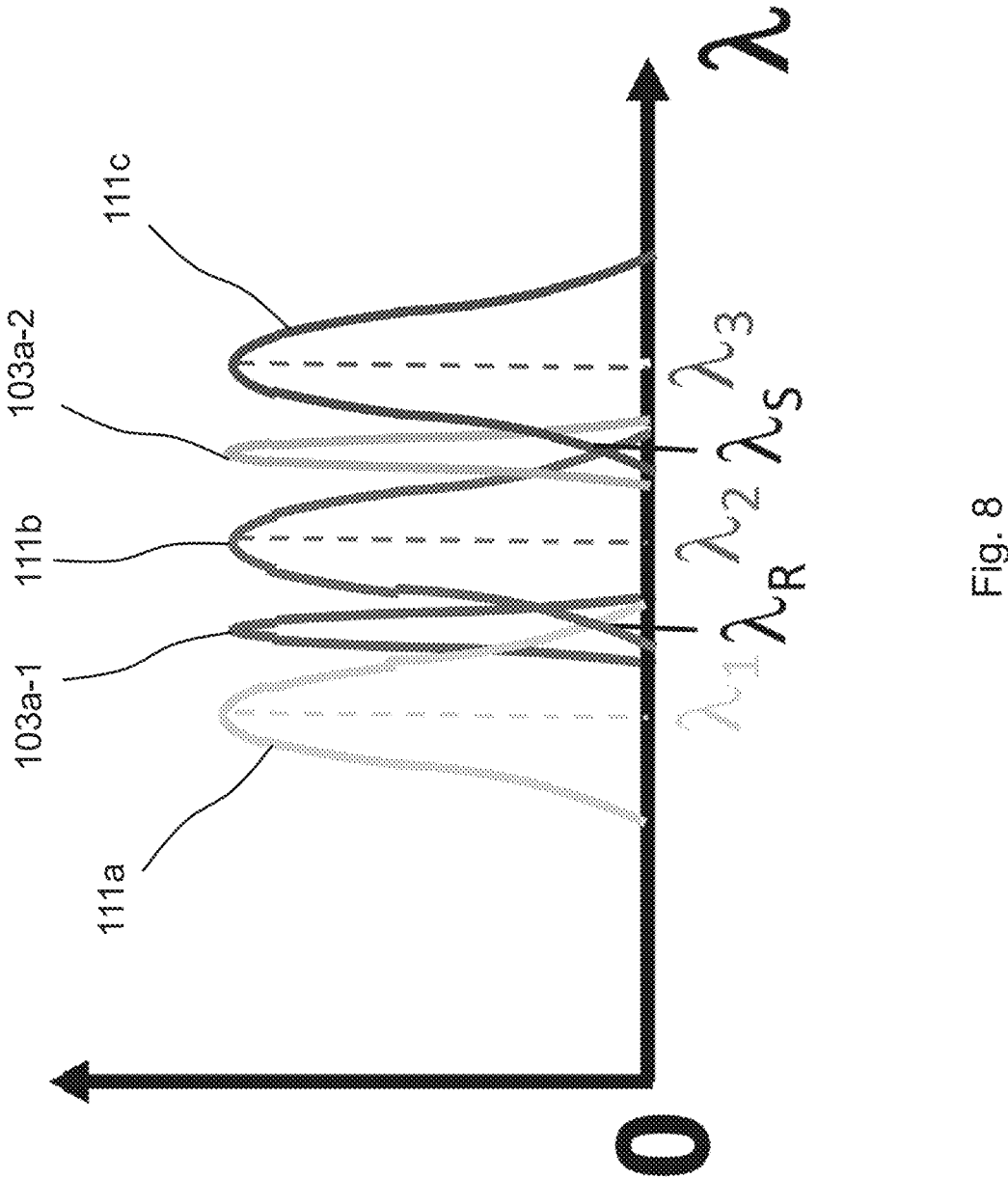
FIG. 8 a three-pixel configuration for the simultaneous interrogation of a sensor and a reference.

However, the condition $$\frac{dR_1}{d\lambda_S} = \frac{dR_2}{d\lambda_R}$$

may be difficult to fulfil in practice. In the general case, the separate measurement of the three parameters $S_\lambda$, $\lambda_S$ and $\lambda_R$ requires three spectral measurements. A possible configuration is shown in FIG. 8, showing a three-pixel configuration for the simultaneous interrogation of a sample sensor part 103a-1 and a reference sensor part 103a-2, the three pixel responses denoted with reference numerals 111a-111b-111c. In principle $\delta\lambda_S$, $\delta\lambda_R$ and $S_\lambda$ can be determined independently from the measured photocurrents.

Also in the case where each detector responds to multiple sensors, it is possible to generalize the least-squares approach above to estimate $(\lambda_S, \lambda_R, S_\lambda)$ from the photocurrents of at least three detectors. It is however questionable whether it is possible to separately measure all the parameters in the model (i.e. the $R_i(\lambda_S, \lambda_R)$) in a practical situation where sensor/reference wavelengths (and detector spectral responses) can vary. In a fabricated sensor, presumably only the photocurrent responses to common-mode wavelength changes (e.g. due to temperature fluctuations) or wavelength differences (due to binding) can be calibrated.

It is therefore useful to recast the wavelengths in terms of average wavelength and wavelength difference:

$$\begin{cases} \bar{\lambda} \equiv \dfrac{\lambda_S + \lambda_R}{2} \\ \Delta\lambda = \lambda_S - \lambda_R \end{cases} \Rightarrow \begin{cases} \dfrac{\partial P_i}{\partial \bar{\lambda}} = \dfrac{\partial P}{\partial \lambda_S} + \dfrac{\partial P_i}{\partial \lambda_R} \\ \dfrac{\partial P_i}{\partial \Delta\lambda} = \dfrac{1}{2}\dfrac{\partial P_i}{\partial \lambda_S} - \dfrac{1}{2}\dfrac{\partial P_i}{\partial \lambda_R} \end{cases}$$

For solving the linear system:

$$\begin{bmatrix} \delta P_1 \\ \delta P_2 \\ \delta P_3 \end{bmatrix} = \begin{bmatrix} \dfrac{\partial P_1}{\partial \bar{\lambda}} & \dfrac{\partial P_1}{\partial \Delta\lambda} & \dfrac{\partial P_1}{\partial S_\lambda} \\ \dfrac{\partial P_2}{\partial \bar{\lambda}} & \dfrac{\partial P_2}{\partial \Delta\lambda} & \dfrac{\partial P_2}{\partial S_\lambda} \\ \dfrac{\partial P_3}{\partial \bar{\lambda}} & \dfrac{\partial P_3}{\partial \Delta\lambda} & \dfrac{\partial P_3}{\partial S_\lambda} \end{bmatrix} \begin{bmatrix} \delta\bar{\lambda} \\ \delta\Delta\lambda \\ \delta S_\lambda \end{bmatrix}$$

$$\begin{bmatrix} \delta\bar{\lambda} \\ \delta\Delta\lambda \\ \delta S_\lambda \end{bmatrix} = \begin{bmatrix} \dfrac{\partial P_1}{\partial \bar{\lambda}} & \dfrac{\partial P_1}{\partial \Delta\lambda} & \dfrac{\partial P_1}{\partial S_\lambda} \\ \dfrac{\partial P_2}{\partial \bar{\lambda}} & \dfrac{\partial P_2}{\partial \Delta\lambda} & \dfrac{\partial P_2}{\partial S_\lambda} \\ \dfrac{\partial P_3}{\partial \bar{\lambda}} & \dfrac{\partial P_3}{\partial \Delta\lambda} & \dfrac{\partial P_3}{\partial S_\lambda} \end{bmatrix}^{-1} \begin{bmatrix} \delta P_1 \\ \delta P_2 \\ \delta P_3 \end{bmatrix}$$

This gives:

$$\delta\Delta\lambda = \dfrac{1}{\|M\|}\left\{\left(-\dfrac{\partial P_2}{\partial \bar{\lambda}}\dfrac{\partial P_3}{\partial S_\lambda} + \dfrac{\partial P_3}{\partial \bar{\lambda}}\dfrac{\partial P_2}{\partial S_\lambda}\right)\delta P_1 + \right.$$
$$\left. \left(\dfrac{\partial P_1}{\partial \bar{\lambda}}\dfrac{\partial P_3}{\partial S_\lambda} - \dfrac{\partial P_3}{\partial \bar{\lambda}}\dfrac{\partial P_1}{\partial S_\lambda}\right)\delta P_2 + \left(-\dfrac{\partial P_1}{\partial \bar{\lambda}}\dfrac{\partial P_2}{\partial S_\lambda} + \dfrac{\partial P_2}{\partial \bar{\lambda}}\dfrac{\partial P_1}{\partial S_\lambda}\right)\delta P_3\right\}$$

with $$\|M\| = \dfrac{\partial P_1}{\partial \bar{\lambda}}\left(\dfrac{\partial P_2}{\partial \Delta\lambda}\dfrac{\partial P_3}{\partial S_\lambda} - \dfrac{\partial P_3}{\partial \Delta\lambda}\dfrac{\partial P_2}{\partial S_\lambda}\right) -$$
$$\dfrac{\partial P_1}{\partial \Delta\lambda}\left(\dfrac{\partial P_2}{\partial \bar{\lambda}}\dfrac{\partial P_3}{\partial S_\lambda} - \dfrac{\partial P_3}{\partial \bar{\lambda}}\dfrac{\partial P_2}{\partial S_\lambda}\right) + \dfrac{\partial P_1}{\partial S_\lambda}\left(\dfrac{\partial P_2}{\partial \bar{\lambda}}\dfrac{\partial P_3}{\partial \Delta\lambda} - \dfrac{\partial P_3}{\partial \bar{\lambda}}\dfrac{\partial P_2}{\partial \Delta\lambda}\right)$$

This expression is such that power fluctuations do not affect the estimation:

$$\dfrac{\partial}{\partial S_\lambda}\delta\Delta\lambda = 0$$

All parameters in $\delta\Delta\lambda$ can be determined by measuring the interrogator's response to common-mode and differential wavelength changes, and to power changes.

In order to minimize the detection limit for given uncorrelated noise in the photocurrent it is necessary to maximize $\|M\|$. The configuration of filters/sensors must be chosen to allow that.

Note that $$\dfrac{\partial P_i}{\partial S_\lambda} = R_i$$

given a certain $\lambda_S$, $\lambda_R$) is always positive. Rewriting gives:

$$\|M\| = \dfrac{\partial P_1}{\partial \bar{\lambda}}\left(\dfrac{\partial P_2}{\partial \Delta\lambda}R_3 - \dfrac{\partial P_3}{\partial \Delta\lambda}R_2\right) -$$
$$\dfrac{\partial P_1}{\partial \Delta\lambda}\left(\dfrac{\partial P_2}{\partial \bar{\lambda}}R_3 - \dfrac{\partial P_3}{\partial \bar{\lambda}}R_2\right) + R_1\left(\dfrac{\partial P_2}{\partial \bar{\lambda}}\dfrac{\partial P_3}{\partial \Delta\lambda} - \dfrac{\partial P_3}{\partial \bar{\lambda}}\dfrac{\partial P_2}{\partial \Delta\lambda}\right)$$

In the case shown in *FIG. 2*, $$\dfrac{\partial P_2}{\partial \bar{\lambda}} = 0, \dfrac{\partial P_2}{\partial \Delta\lambda} < 0, \dfrac{\partial P_1}{\partial \Delta\lambda} = \dfrac{\partial P_3}{\partial \Delta\lambda} > 0, \dfrac{\partial P_1}{\partial \bar{\lambda}} = -\dfrac{\partial P_3}{\partial \bar{\lambda}} < 0, R_1 = R_3$$

so that $$\|M\| = \dfrac{\partial P_1}{\partial \bar{\lambda}}\left(\dfrac{\partial P_2}{\partial \Delta\lambda}R_3 - \dfrac{\partial P_3}{\partial \Delta\lambda}R_2\right) - \dfrac{\partial P_1}{\partial \Delta\lambda}\left(-\dfrac{\partial P_3}{\partial \bar{\lambda}}R_2\right) + R_1\left(-\dfrac{\partial P_3}{\partial \bar{\lambda}}\dfrac{\partial P_2}{\partial \Delta\lambda}\right) ==$$
$$2R_2\left|\dfrac{\partial P_1}{\partial \Delta\lambda}\right|\left|\dfrac{\partial P_1}{\partial \bar{\lambda}}\right| + R_1\left|\dfrac{\partial P_1}{\partial \bar{\lambda}}\right|\left|\dfrac{\partial P_2}{\partial \Delta\lambda}\right| = \left|\dfrac{\partial P_1}{\partial \bar{\lambda}}\right|\left(R_1\left|\dfrac{\partial P_2}{\partial \Delta\lambda}\right| + 2R_2\left|\dfrac{\partial P_1}{\partial \Delta\lambda}\right|\right)$$

In the above expression, all terms in $\|M\|$ are positive, providing a good configuration for sensing wavelength differences.

In an example, a change in the resonant wavelength of the sensing element 103, as produced for example by a change in refractive index, produces a change in the photocurrents, which can be used to measure the wavelength shift. When using two detectors 111a and 111b, it is possible to measure the wavelength shift independently of the incoming power, making the interrogation robust against power fluctuations in the source. Similarly, an array of N+1 detectors can be used to monitor N sensors, enabling multiplexing. In the case N=2, this allows measuring differential wavelength shifts between a sensor and a reference, thereby correcting for temperature shifts in both the sensing element and the interrogator.

Figure 9:
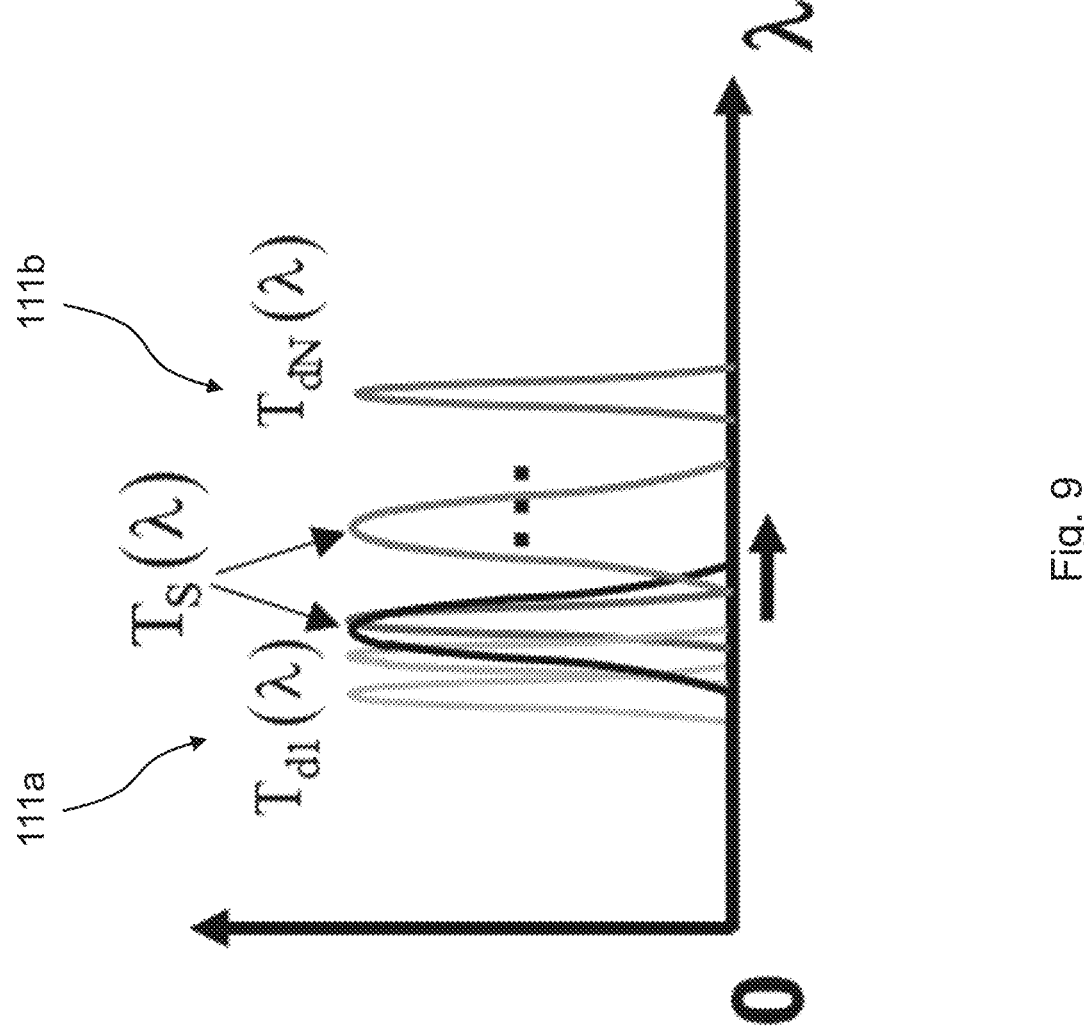
FIG. 9 a multi-pixel configuration for interrogation over a large range.

The outline described above applies to small wavelength shifts, such that the detector responses can be linearized. For sensing of absolute temperature, pressure or refractive index, a substantial dynamic range (e.g. 10-200° C.) is required, corresponding to large changes in wavelength (tens of nm), exceeding the typical linewidth of the interrogator pixels 115. In this case a larger number of pixels 115 (for example a number of 4-16 pixels) can be used to combine high resolution and large dynamic range. This is depicted in FIG. 9 depicting a multi-pixel configuration for interrogation over a large range.

In the general case of N detectors with arbitrary response spectrum $T_{di}(\lambda)$, the problem gives an overdetermined nonlinear system:

$$\begin{cases} P_1(\lambda_S) = P_1 \\ \ldots \\ P_N(\lambda_S) = P_N \end{cases}$$

The sensor wavelength can be estimated by numerically minimizing the square error, $$\min\left\{\sum_{i=1}^{N}(P_i(\lambda_S)-P_i)^2\right\}$$

In general, the sensor (for example a Fabry-Perot sensor) may have a spectrum with several peaks covering a large range, up to hundreds of nanometers. In this case the information on the measurand of interest (for example temperature or pressure) can be obtained by combining the outputs of multiple detectors, each presenting one or more spectral peaks in the range covered by the sensor. The least-square or other regression method can be applied to estimate the measurand of interest using a set of reference measurements obtained in calibration step.

In order to avoid unwanted spatial imaging effects (variations of photocurrent due to variations in the spatial distribution of the incoming light), different detector geometries can be employed.

Figure 10:
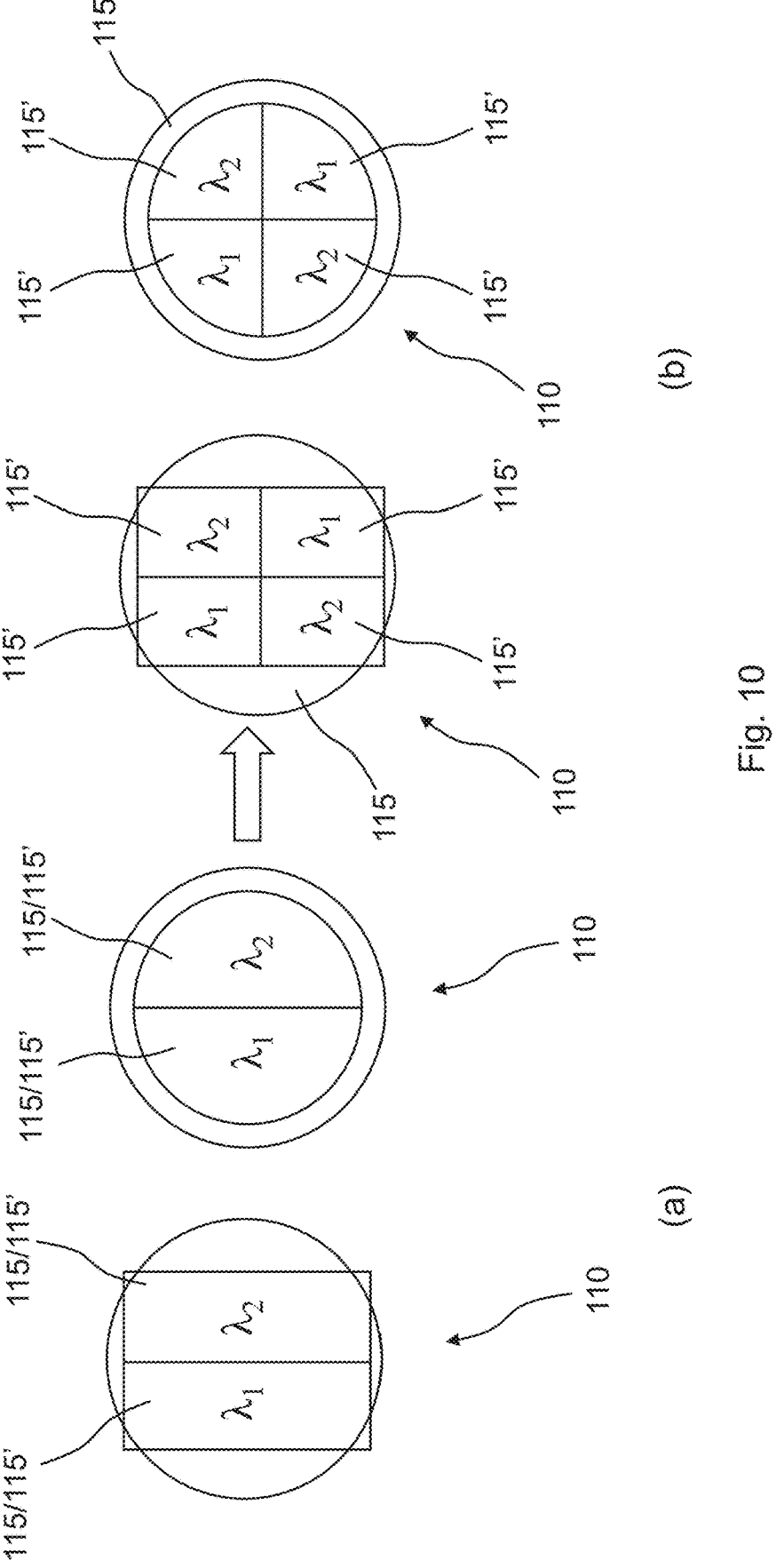
FIG. 10 configurations having two- and four-pixel geometries.
Figure 11A:
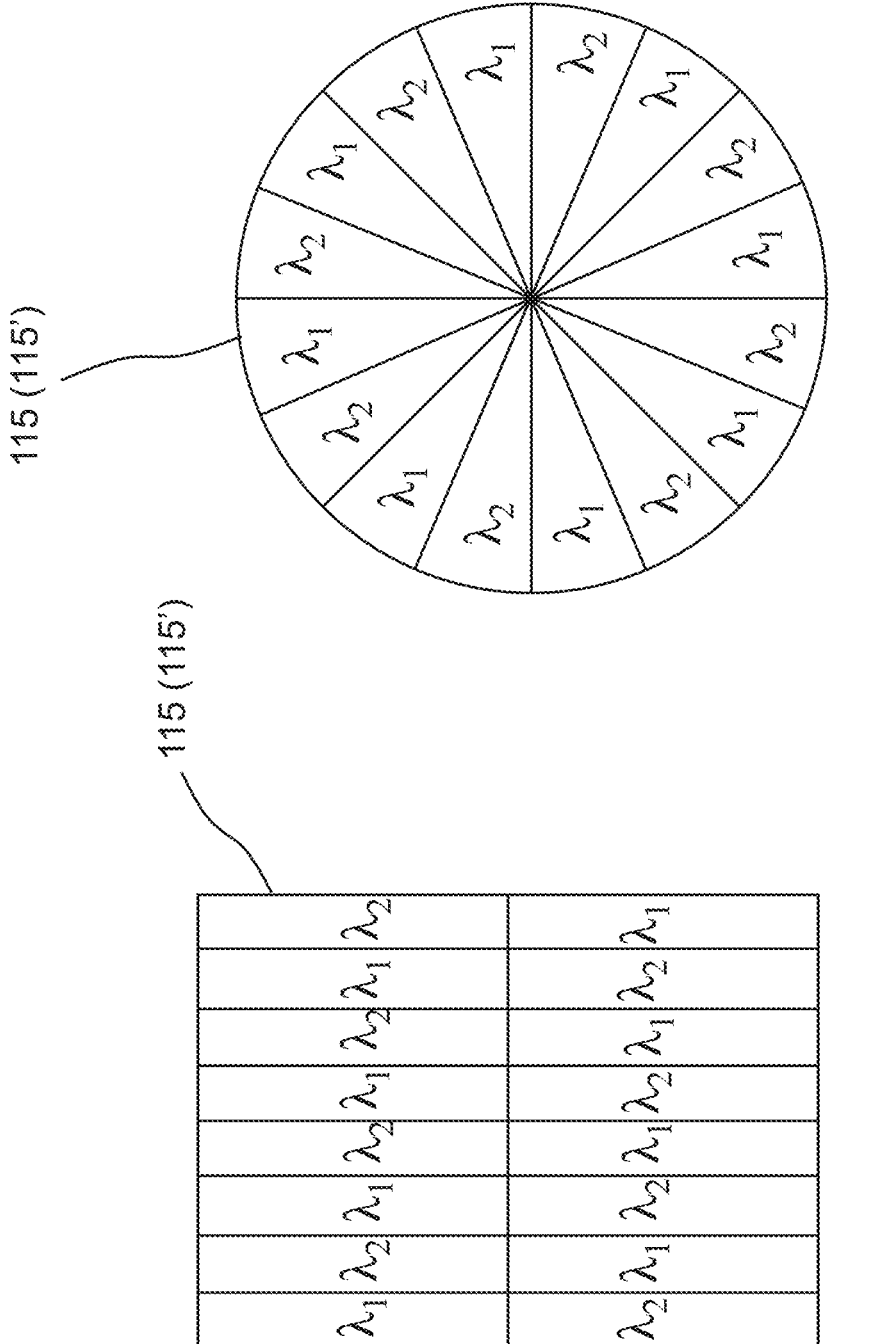
FIG. 11 configurations of multipixel geometries with splitted pixels with FIG. 11*a* based on a two-pixel geometry and FIG. 11*b* based on a four-pixel geometry.
Figure 11B:
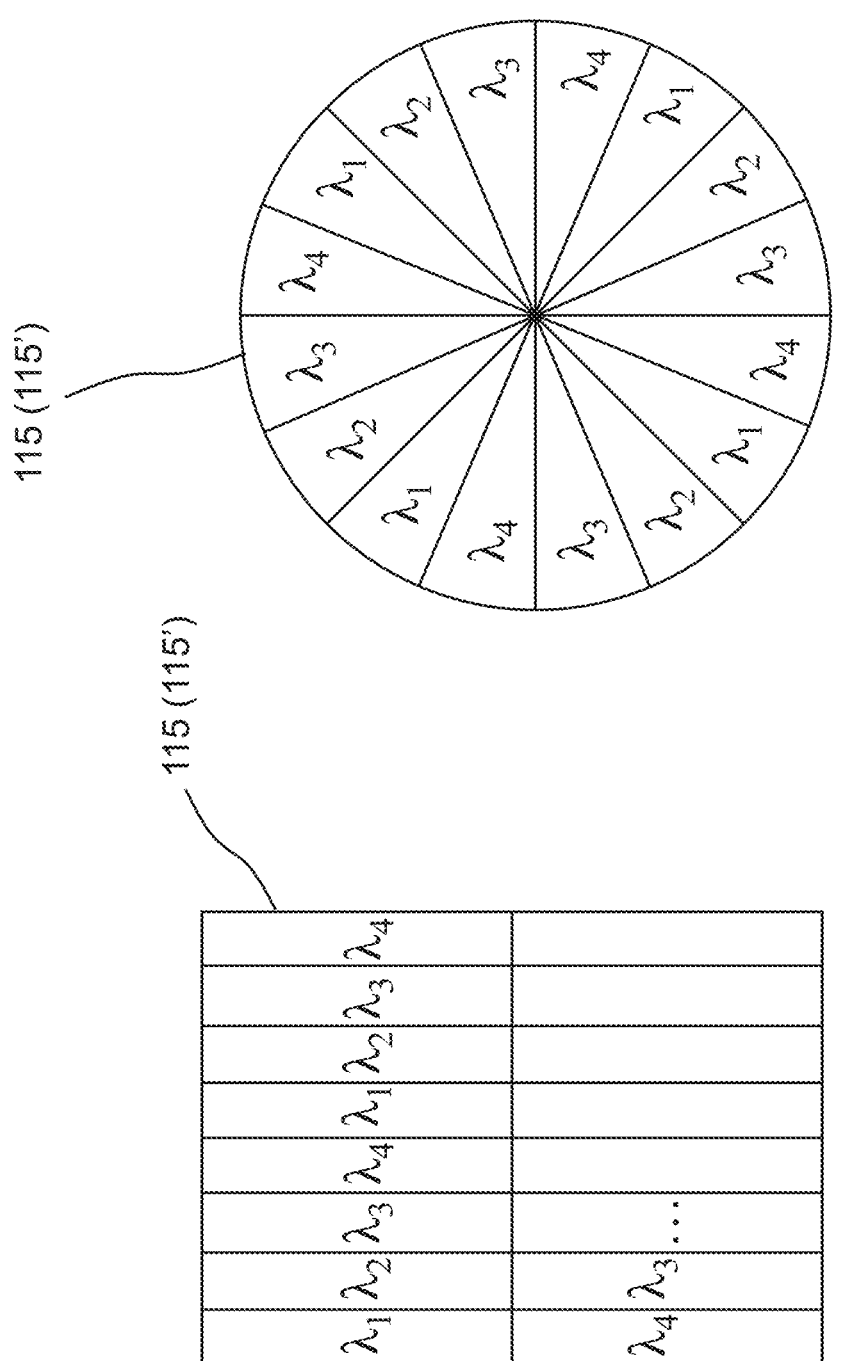
Figure 12:
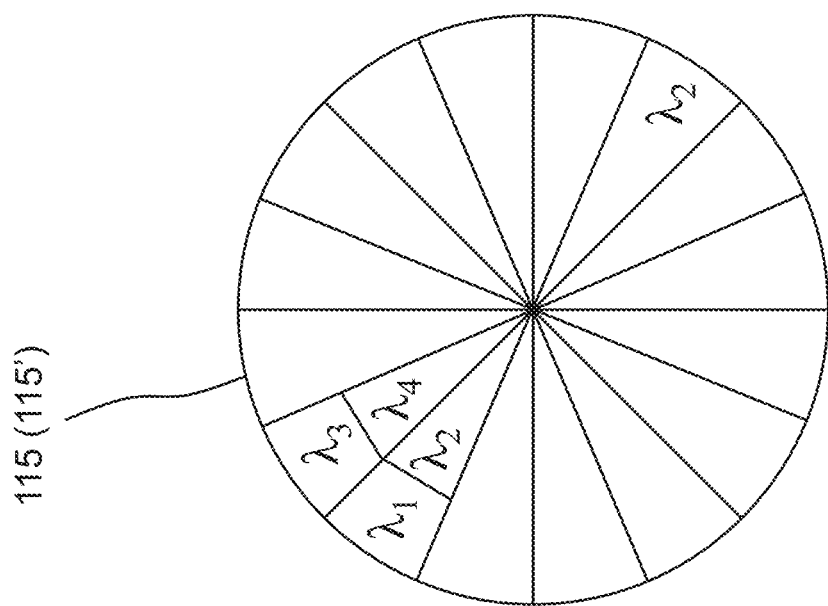
FIG. 12 another configuration of multipixel geometries.
Figure 12:
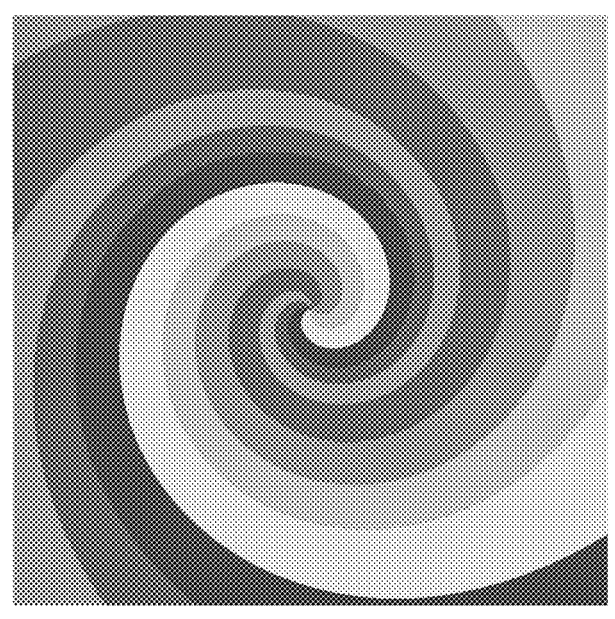

FIG. 10 depicts detector configurations 110 having a circular geometry, in particular two-pixel (FIG. 10*a*) and four-pixel geometries (FIG. 10*b*). In other configurations, one pixel 115 is split in multiple subpixels 115' with the same resonant structure, which multiple subpixels 115' are distributed throughout the array. Of these configurations of multipixel geometries with splitted subpixels 115', FIG. 11*a* shows a two-pixel example λ1-λ2, whereas FIG. 11*b* depicts a four-pixel λ1-λ2-λ3-λ4 example. Yet other configurations implement more complex geometries, such as the example of FIG. 12.

For biosensing or gas sensing applications it is important to measure the presence of different molecules in the same specimen, or to increase the specificity in the detection of a single marker by using different binding complexes and comparing the relative binding probability. This can be done, both in free-space and via fibers, by taking advantage of the small form factor of the interrogating chip. A number of sensors and integrators can be integrated on sensing and interrogating chips, or packaged together.

A first approach to multiplexing is using the spectral domain. As discussed above, three detectors can be used to monitor a sample sensor part 103*a*-1 and a reference sensor part 103*a*-2. Similarly, an array of N+1 detectors 111 (111*a*-111*b* etc.) can be used to monitor N sensors, enabling spectral multiplexing. The spectral width of the source and the characteristics of the filters 113 in the interrogator 110 will determine the maximum number of sensors.

Figure 13:
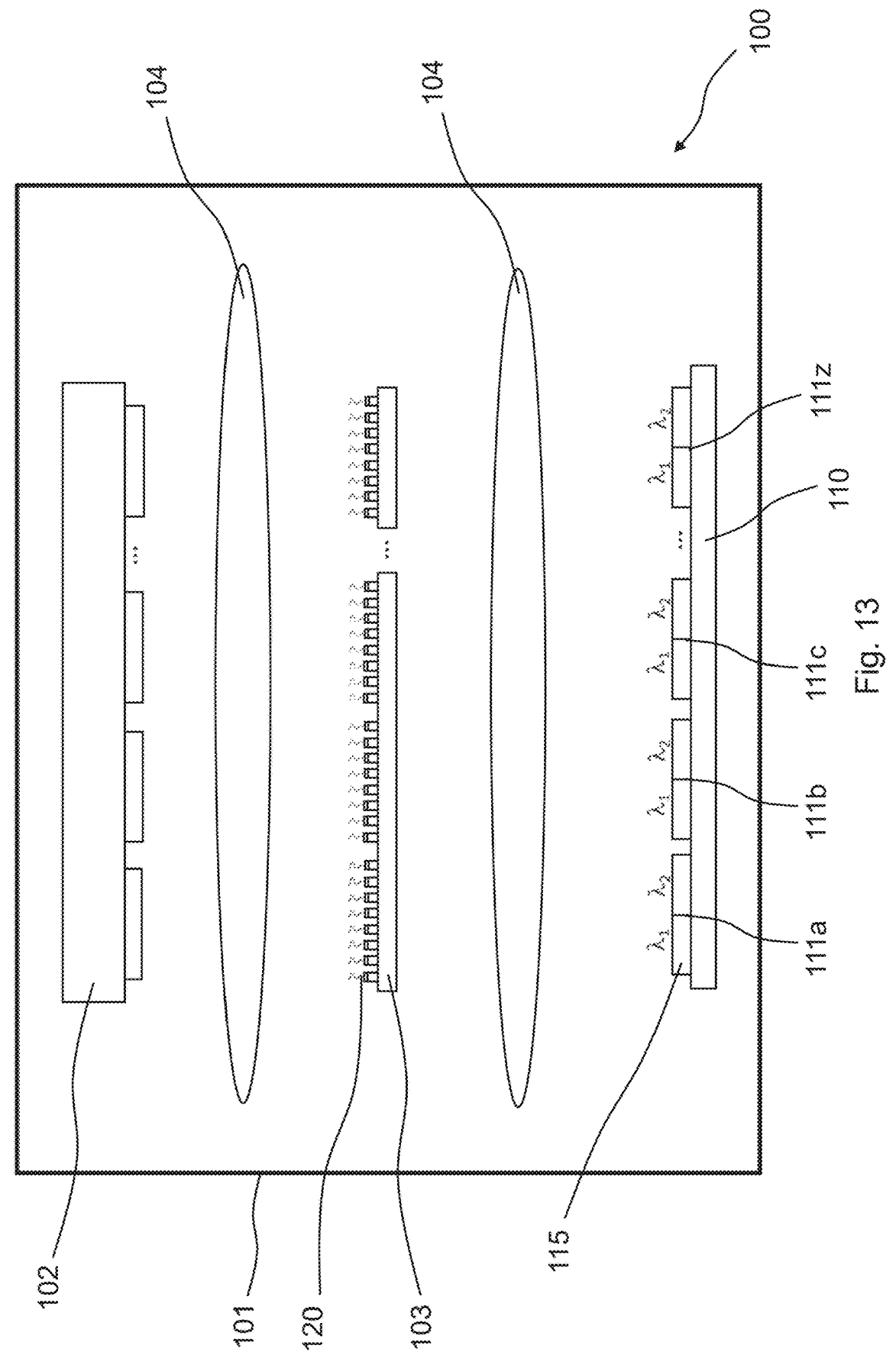
FIG. 13 a configuration of a module for multiplexed sensing.

Another approach to multiplexing is spatial multiplexing. A possible configuration for spatially-multiplexed sensing in free space within a compact module 101 is depicted in FIG. 13. Note that in FIG. 13, only the optical part is shown, a practical module would include electronic boards for driving the LEDs 102, readout of the detectors 111*a*-111*b*-111*c*- . . . -111*z* (with the number of detectors being 1, 2, or more than 10, 20 or even 50) and connectivity, and microfluidics or gas handling. A multiplexed read-out of 100 sensors or more can be achieved with a cm-scale module, where the sensing chip 100 can be a disposable. A similar approach can be applied to fiber-based sensing by using multicore fibers, where each core is aligned with one sensor and one interrogator, which are each part of sensing and interrogating chips.

LIST OF REFERENCE NUMERALS USED

100 sensing system according to the disclosure
101 housing module
102 light emitting source,

103 sensing element
103*a* sensing area
103*a*-1 sample sensor part
103*a*-2 reference sensor part
104 optical means
110 integrated interrogator
111*a*-111*z* detector(s) of interrogator
112 top face of detector
113 filter element
114 resonant-cavity detector structure
115 pixels of integrated interrogator
115' subpixel
120 molecule to be sensed

The invention claimed is:

1. A sensing system comprising:
   at least one light emitting source;
   a sensing element comprising a sensing area; and
   an optical director configured to direct light emitted by the at least one light emitting source onto the sensing area of the sensing element, and to direct light transmitted or reflected from the sensing area of the sensing element to an integrated interrogator;
   wherein the integrated interrogator comprises at least two detectors, wherein each detector comprises a filter and is configured to detect part of the spectrum of the light directed from the sensing area of the sensing element, and wherein each filter is positioned on a top face of its respective detector or within its respective detector, as viewed from a direction of the light leaving the sensing element.

2. The sensing system according to claim 1, wherein the filters and the detectors are co-integrated in a resonant-cavity detector structure.

3. The sensing system according to claim 1, wherein the at least two detectors are arranged in a circular, a square, a rectangular, a spiral, or an interlaced configuration.

4. The sensing system according to claim 1, wherein the sensing area of the sensing element comprises at least one sample sensor part and at least one reference sensor part, and wherein multiple detectors are used in the interrogator to measure differential wavelength shifts between the at least one sample sensor part and the at least one reference sensor part.

5. The sensing system according to claim 1, wherein the sensing element is selected from the group including a grating, a photonic crystal, a metallic structure, a semiconductor structure, a Fabry-Perot cavity, and a semiconductor slab, and whereby the spectrum of light transmitted or reflected from the sensing element changes depending on temperature, pressure, refractive index, or the binding of molecules on the surface of the sensing area.

6. The sensing system according to claim 1, wherein a surface of the sensing area of the sensing element is configured to facilitate or suppress a selective binding of a certain molecule or type of molecule.

7. The sensing system according to claim 1, wherein the sensing element is configured to accommodate a microfluid cell element in the sensing area.

8. The sensing system according to claim 1, wherein:
   the at least one light emitting source comprises an array of light emitting diode elements;
   the sensor element comprises an array of sensor areas; and
   the integrated interrogator comprises an array of detectors.

9. The sensing system according to claim 1, wherein the at least one light emitting source, the sensing element, and the integrated interrogator are mounted face-to-face in a linear or 2D matrix configuration.

10. The sensing system according to claim 1, wherein the at least one light source, the sensing element, and the optical director are optically coupled via single-mode or multi-mode optical fibers.

11. The sensing system according to claim 1, wherein the at least one light source, the sensing element, and the optical director are provided in a single housing module.

* * * * *